(No Model.)
G. HUEBNER.
BAKING OVEN.
No. 557,390. Patented Mar. 31, 1896.
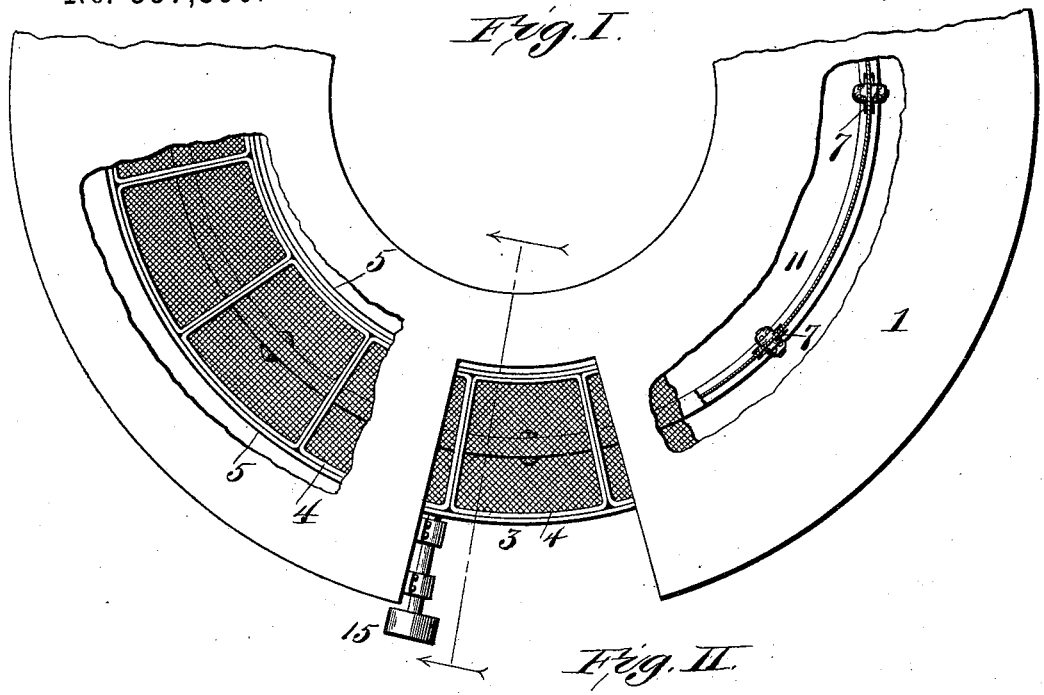
Fig. I.
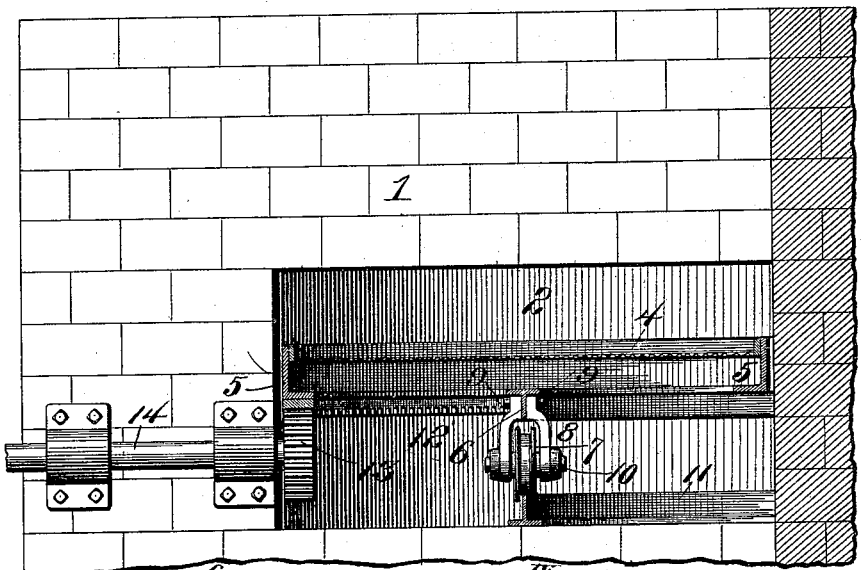
Fig. II.
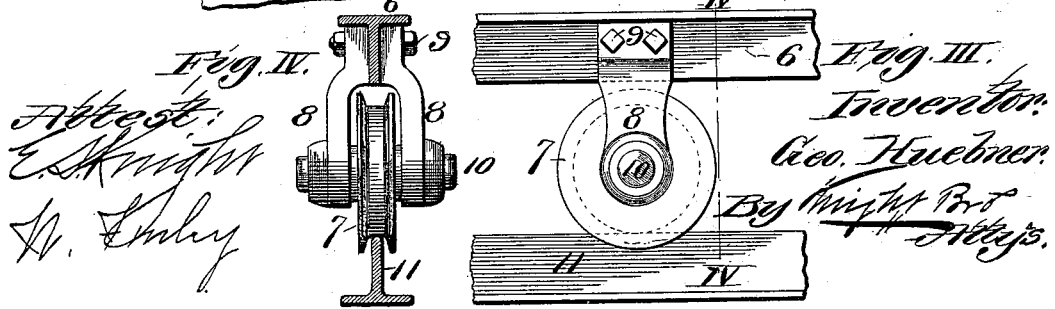
Fig. IV.   Fig. III.
Attest:
E. S. Knight
H. Finley
Inventor
Geo. Huebner
By Knight Bro.
Attys.

UNITED STATES PATENT OFFICE.

GEORGE HUEBNER, OF ST. LOUIS, MISSOURI.

BAKING-OVEN.

SPECIFICATION forming part of Letters Patent No. 557,390, dated March 31, 1896.

Application filed August 24, 1895. Serial No. 560,378. (No model.)

*To all whom it may concern:*

Be it known that I, GEORGE HUEBNER, of the city of St. Louis, in the State of Missouri, have invented a certain new and useful Improvement in Baking-Ovens, of which the following is a full, clear, and exact description, reference being had to the accompanying drawings, forming a part of this specification.

My present invention relates to the class of ovens shown and described in my application for United States Patent, Serial No. 486,740, filed September 28, 1893; this class of ovens being designed more particularly for use in baking pretzels, although they may be used for baking other articles.

My present invention consists in features of novelty hereinafter fully described, and pointed out in the claims.

Figure I is a detail top view of an oven provided with my improvement, part of the top of the oven and part of the carrier being broken away. Fig. II is an enlarged detail vertical section taken on the dotted line Fig. I and looking in the direction of the arrows. Fig. III is an enlarged detail view showing part of the carriage, one of the supporting-wheels, and part of the rail or track. Fig. IV is a section taken on line IV IV, Fig. III.

Referring to the drawings, 1 represents part of an oven, having a baking-chamber 2. This oven is provided with a fire-box, and with circulating-flues, and with an uptake or chimney. (Not shown.) They form no part of my present invention, and may be either in the form and arrangement shown in my application referred to or may be in any other approved form of construction.

The oven is provided with a working space 3, set forth in the application mentioned.

The oven is of the rotary type, and the pretzels or other articles to be baked are put in pans 4 and placed upon the circular carriage 5, arranged within the baking-chamber 2. The carriage traverses the working space 3, (shown in Fig. I,) and as it revolves the pans are exposed one after another in the working space. As the pans are exposed they are removed, (the pretzels having been baked sufficiently while the pans are traveling through the baking-chamber,) and the pans, as they are exposed and removed from the carriage, are replaced by pans filled with unbaked pretzels. Each time a pan is exposed the carriage is stopped and the exchange of pans is quickly made by a single attendant, and then the carriage is started in motion again and turned sufficiently far to expose the next pan, and so on, the operation going on continuously.

Owing to the high temperature within the baking-chamber, I experienced (with the carriage arrangement set forth in my application mentioned) considerable difficulty in keeping the carriage and its supporting and carrying parts in proper order without much loss of time and labor; one of the principal difficulties being the inaccessibility to the supporting-wheels and their journals, as well as their supports, which were liable to become warped and out of shape, owing to the high temperature within the baking-chamber. With my present arrangement the supporting-wheels and their parts traverse the working space, so that they can be easily removed and repaired when exposed at the working space.

On the under side of the carriage is a circular ring 6, which is preferably made in the form of a T-rail. To this ring the supporting-wheels 7 are secured by yokes 8, made fast to the ring by means of bolts 9. The wheels are journaled to the yokes by means of pins 10. Beneath the wheels is a circular track-rail 11 made fast to the bottom of the baking-chamber. The wheels are grooved to receive the track-rail to avoid danger of their displacement from the track and to support the carriage concentrically within the baking-chamber and avoid contact between the carriage and the vertical walls of the baking-chamber.

It will be observed that as the carriage revolves the supporting-wheels are exposed one after another by traversing the working space, and thus they can be readily examined to see that they turn freely, and when needing repairs can be readily taken out by removing the bolts 9, and after being repaired can be readily replaced.

The under side of the carrier is provided with an annular rack 12, engaged by a pinion 13, secured to a shaft 14 journaled to one wall of the working space and provided with a driving-pulley 15, which receives a belt from any suitable motor.

I claim as my invention—

1. A baking-oven comprising a circular chamber, and a working space, a circular track located in the circular chamber, and extending across the working space, a circular carriage located in the circular chamber and extending across the working space, a circular ring secured to the circular carriage and wheels removably secured to the circular ring, and traveling on the circular track; substantially as described.

2. A baking-oven comprising a circular chamber, and a working space, a circular track located in the circular chamber, and extending across the working space, a circular carriage located in the circular chamber and extending across the working space, a circular ring secured to the circular carriage, yokes bolted to the circular ring, and grooved wheels journaled to the yokes and traveling on the circular track; substantially as described.

GEORGE HUEBNER.

In presence of—
GEO. H. KNIGHT,
W. FINLEY.